United States Patent
DeLand et al.

(10) Patent No.: US 11,920,666 B2
(45) Date of Patent: Mar. 5, 2024

(54) ROTARY POWER TRANSMISSION DEVICE WITH BI-STABLE CLUTCH

(71) Applicant: GKN Automotive Limited, Birmingham (GB)

(72) Inventors: Benjamin DeLand, Ann Arbor, MI (US); Varadarajan Balaraman, Oxford, MI (US); Brent M. Peura, Farmington, MI (US)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 18/197,758

(22) Filed: May 16, 2023

(65) Prior Publication Data
US 2023/0383830 A1 Nov. 30, 2023

Related U.S. Application Data

(60) Provisional application No. 63/347,318, filed on May 31, 2022.

(51) Int. Cl.
| | |
|---|---|
| *F16H 48/34* | (2012.01) |
| *F16H 48/24* | (2006.01) |
| *F16H 57/037* | (2012.01) |

(52) U.S. Cl.
CPC ............. *F16H 48/34* (2013.01); *F16H 48/24* (2013.01); *F16H 57/037* (2013.01)

(58) Field of Classification Search
CPC ........ F16H 48/34; F16H 48/24; F16H 57/037; F16H 48/40; F16H 37/08; F16D 27/06; F16D 27/108; F16D 2027/007; F16D 27/004

USPC .................................................. 475/230, 231
See application file for complete search history.

(56) References Cited

U.S. PATENT DOCUMENTS

| | | | |
|---|---|---|---|
| 7,247,118 B2 | 7/2007 | Haruki et al. | |
| 8,454,471 B2* | 6/2013 | Isken, II | .................. F16H 48/24 |
| | | | 192/84.92 |
| 9,422,988 B2 | 8/2016 | Beesley et al. | |
| 10,190,667 B2 | 1/2019 | Onitake et al. | |
| 10,914,347 B2 | 2/2021 | Finkenzeller | |
| 2007/0054771 A1 | 3/2007 | Fusegi | |
| 2012/0103750 A1* | 5/2012 | Sakamoto | ............... F16D 27/06 |
| | | | 192/84.7 |
| 2014/0004988 A1 | 1/2014 | Yamanaka et al. | |

(Continued)

FOREIGN PATENT DOCUMENTS

| | | |
|---|---|---|
| JP | 2018059606 A | 4/2018 |
| WO | WO2016035129 A1 | 3/2016 |

*Primary Examiner* — Roger L Pang
(74) *Attorney, Agent, or Firm* — Reising Ethington P.C.

(57) ABSTRACT

A power transmission device includes a clutch, an actuator and a stop member. The clutch is received within a first housing and has a first clutch member coupled to the second housing and a second clutch member coupled to the first housing, the second clutch member is movable and selectively engageable with the first clutch member. The actuator has a coil and a plunger driven for movement by a magnetic field generated by the coil so that the plunger moves axially to move the second clutch member relative to the first clutch member. The stop member has a retracted position spaced from the plunger and an advanced position within a path of movement of the plunger to limit movement of the plunger when the stop member is in the advanced position.

20 Claims, 4 Drawing Sheets

(56) References Cited

U.S. PATENT DOCUMENTS

2017/0297428 A1  10/2017  Inose et al.
2022/0299070 A1* 9/2022  Ohnemus ................ F16D 41/14

* cited by examiner

ROTARY POWER TRANSMISSION DEVICE WITH BI-STABLE CLUTCH

REFERENCE TO RELATED APPLICATIONS

This application claims the benefit of U.S. Provisional Application Ser. No. 63/347,318 filed on May 31, 2022 the entire content of which is incorporated herein by reference in its entirety.

TECHNICAL FIELD

The present disclosure relates generally to rotary power transmission device having a clutch that is driven by an electric actuator and that may be maintained in both engaged and disengaged positions of the clutch without application of electricity to the electric actuator.

BACKGROUND

Electromagnetic actuators may be used to move a clutch between engaged and disengaged positions by application of electricity to a wire coil which generates a magnetic field. To maintain one or both positions of the clutch, the electricity is continuously provided to the coil to continuously generate a magnetic field. The continuously provided electricity increases the electrical power consumption of a vehicle and reduces the efficiency of the device and vehicle.

SUMMARY

In at least some implementations, a rotary power transmission device, includes first and second housings, a clutch, an actuator and a stop member. The first housing has an interior in which multiple gears are received for rotation, and the second housing is carried by the first housing. The clutch is received within the first housing and has a first clutch member coupled to the second housing and a second clutch member coupled to the first housing, the second clutch member is movable and selectively engageable with the first clutch member. The actuator has a coil and a plunger driven for movement by a magnetic field generated by the coil, and the plunger moves along an axis and moves the second clutch member relative to the first clutch member. The stop member is movable between a retracted position spaced from the plunger and an advanced position within a path of movement of the plunger to limit movement of the plunger when the stop member is in the advanced position.

In at least some implementations, the stop member moves in response to the magnetic field generated by the coil. In at least some implementations, the stop member moves toward the advanced position when current of a first polarity is supplied to the coil, and the stop member moves away from the advanced position when current of a second polarity is supplied to the coil.

In at least some implementations, the plunger has a first position in which the plunger does not cause the second clutch member to engage the first clutch member and the plunger has a second position in which the plunger causes the second clutch member to engage the first clutch member, and when the stop member is in the advanced position the stop member prevents movement of the plunger away from the second position. In at least some implementations, the stop member is maintained in the advanced position without a magnetic field being generated by the coil. In at least some implementations, a retention mechanism has a first position in which the retention mechanism prevents movement of the stop member and a second position in which movement of the stop member is permitted. In at least some implementations, the retention mechanism includes a ball that is yieldably biased by a spring into the path of movement of the stop member.

In at least some implementations, the stop member includes a permanent magnet within the magnetic field generated by the coil, and the stop member moves to the advanced position when current of a first polarity is provided to the coil and the stop member moves to the retracted position when current of a second polarity is provided to the coil. In at least some implementations, a magnetic component to which the magnet is attracted or repelled to position the stop member in either the advanced position or the retracted position in the absence of a magnetic field being generated by the coil, and when a magnetic field is generated by the coil, the stop member is moved against the force between the magnetic component and the magnet.

In at least some implementations, the stop member moves radially relative to the axis. In at least some implementations, the plunger includes a radially extending stop surface that is selectively radially overlapped by the stop member. In at least some implementations, the stop member includes a radiused portion and the plunger includes a projection that is received against the radiused portion when the stop member is in the advanced position to yieldably retain the stop member in the advanced position.

In at least some implementations, the stop member is coupled to a pivot and the stop member rotates about the pivot between the advanced position and the retracted position. In at least some implementations, a magnet is spaced from the pivot and has a first pole closer to the stop member than a second pole, and the stop member rotates about pivot when the coil generates a magnetic field.

In at least some implementations, the stop member includes a ball yieldably biased by a spring to the advanced position to yieldably inhibit movement of the plunger, and wherein the plunger is moved relative to the stop member when the coil generates a magnetic field. In at least some implementations, a retention mechanism is associated with the second clutch member to yieldably retain a position of the second clutch member.

In at least some implementations, a rotary power transmission device, includes a first housing having an interior in which multiple gears are received for rotation, a second housing carried by the first housing, a clutch received within the first housing and having a first clutch member coupled to the second housing and a second clutch member coupled to the first housing, the second clutch member being movable and selectively engageable with the first clutch member, an actuator having a coil and a plunger driven for movement by a magnetic field generated by the coil, wherein the plunger moves along an axis and moves the second clutch member relative to the first clutch member, and a stop member. The stop member is movable between a retracted position spaced from the plunger and an advanced position within a path of movement of the plunger to limit movement of the plunger when the stop member is in the advanced position, and the stop member moves in response to the magnetic field generated by the coil.

In at least some implementations, a stop member retains a position of a plunger to, for example, permit a clutch to be maintained in an engaged, torque transmitting state without the need to maintain power to a coil of an actuator. In this way, the state of the clutch can be maintained with less power consumption and the efficiency of the device is improved. The stop member may include a magnet so that the stop member moves in response to the magnetic field generated by the coil. A ferrous or magnetic component may be provided to attract or repel the stop member and such attraction or repelling force is overcome by the magnetic field generated by the coil, to control movement of the stop member between its advanced and retracted positions.

BRIEF DESCRIPTION OF THE DRAWINGS

The following detailed description of preferred embodiments and best mode will be set forth with reference to the accompanying drawings, in which.

DETAILED DESCRIPTION

Figure 1:
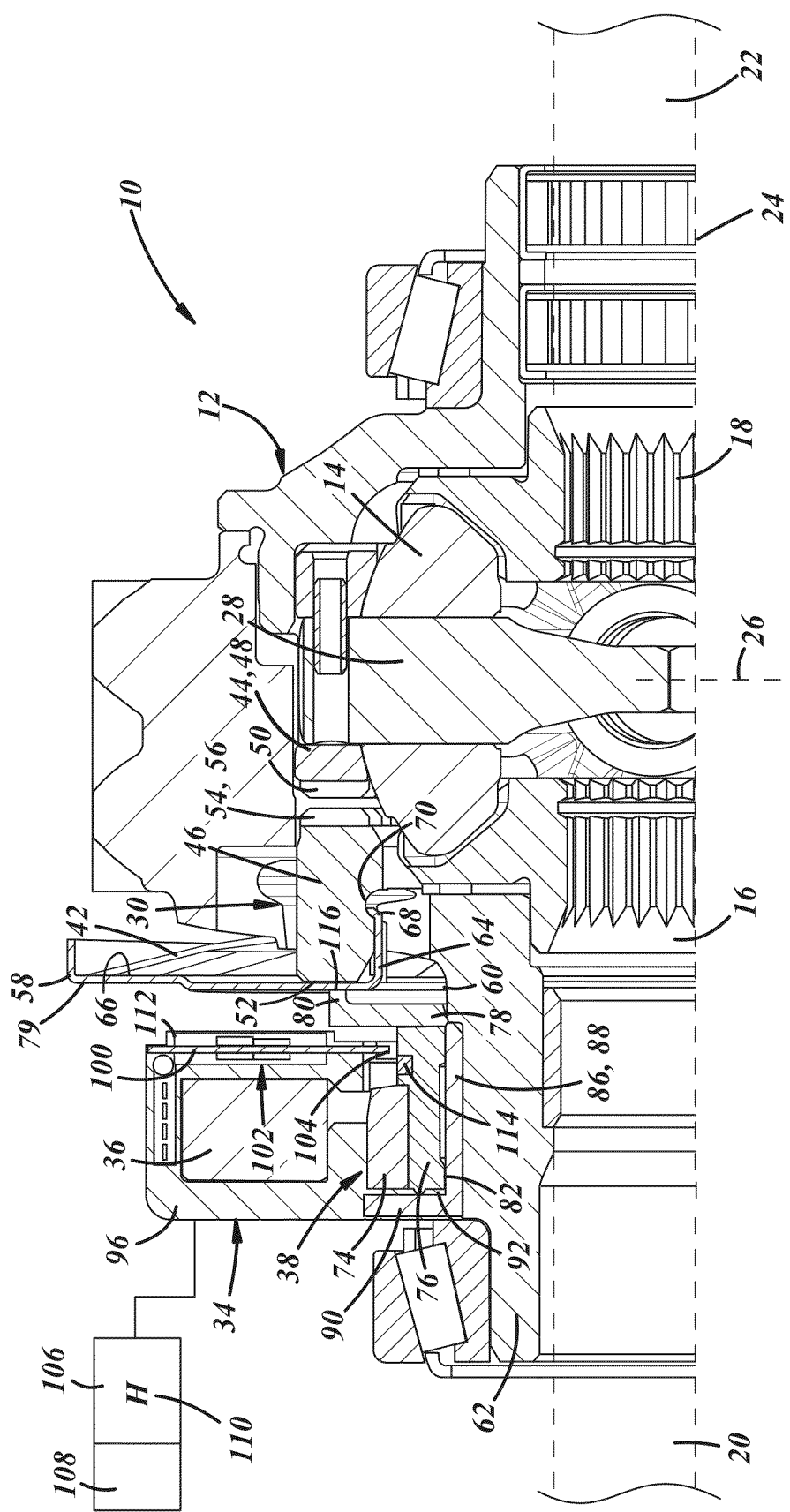
FIG. 1 is a cross-sectional view of a portion of a differential with an electrically actuated clutch and an electrically actuated stop member, wherein the clutch is shown in a disengaged position.
Figure 2:
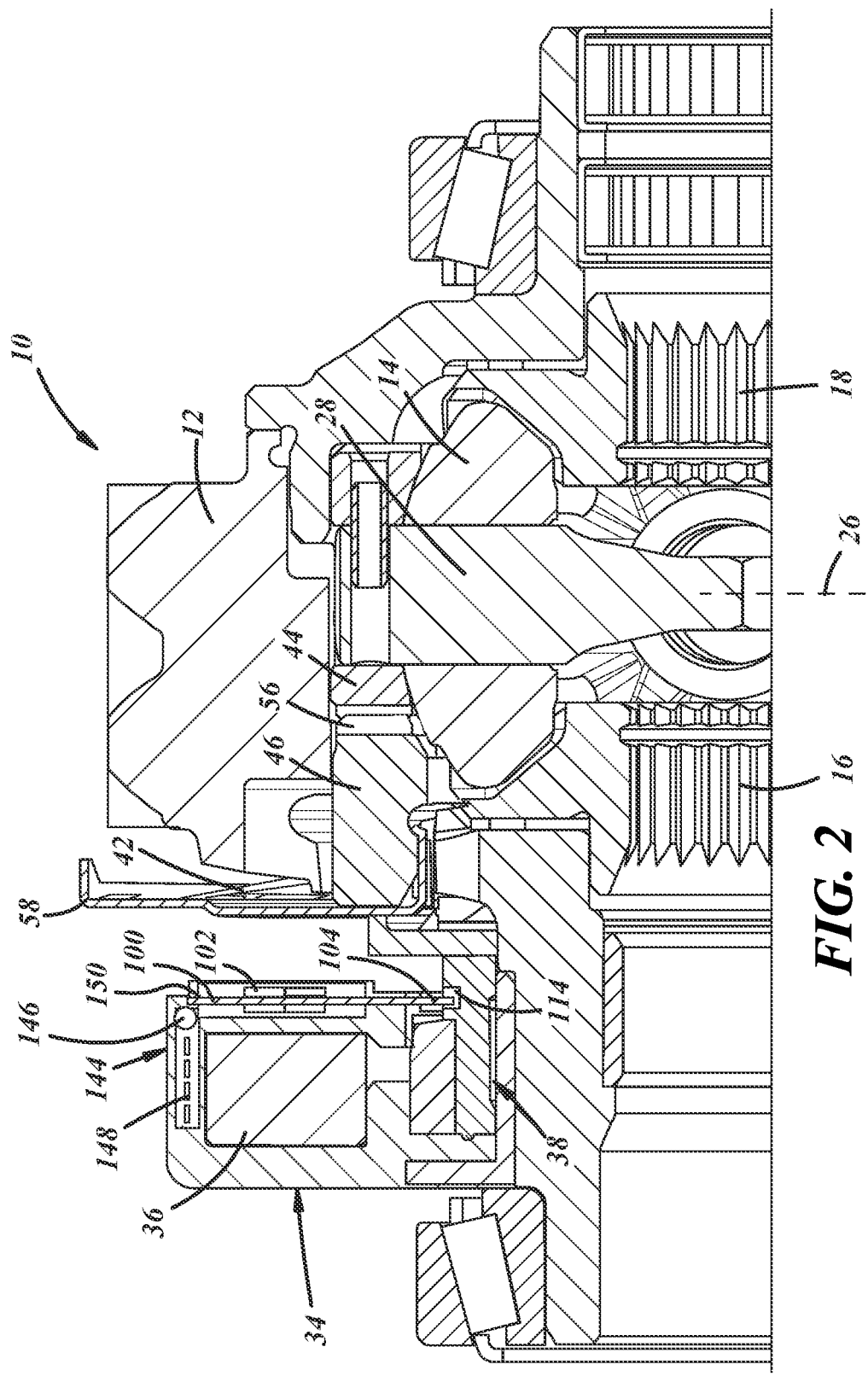
FIG. 2 is a cross-sectional view of a portion of the differential with the clutch shown in an engaged position and the stop member shown in an advanced position.

Referring in more detail to the drawings, FIGS. 1 and 2 illustrate a portion of a differential 10 such as may be used in an e-axle (e.g. an e-motor driven final drive unit, or any drive assembly). The differential 10 includes an outer housing 12, two or more pinion gears 14 (only one shown in FIGS. 1 and 2), and a pair of side gears 16, 18 that are arranged to be coupled to rotating shafts 20, 22 that may drive, for example, wheels of a vehicle. Thus, the side gears 16, 18 rotate with the shafts 20, 22 (shown diagrammatically in FIG. 1) about a shaft axis 24 and the pinion gears 14 are rotatable about an axis 26 defined by a pinion gear shaft 28 extending through the pinion gears.

The differential 10 also includes a clutch assembly 30 that is driven by an actuator 32 having a solenoid 34 with an annular wire coil 36 and a drive member that may include an armature or plunger 38 that may be received at least partially radially inwardly of and axially overlapped with the coil 36. In at least some implementations, the plunger 38 is also annular, the plunger and coil 36 are coaxially arranged about axis 24 and are carried by the outer housing 12 of the differential 10 for rotation with the outer housing 12. One shaft 20 extends coaxially through a portion of the housing 12 that extends through the coil 36 and plunger 38. Electric power is supplied to the coil 36 to generate a magnetic field that displaces the plunger 38 relative to the coil 36 and outer housing 12 from a first or retracted position (FIG. 1) to a second or advanced position (FIG. 2). To facilitate return of the plunger 38 from the second position back to the first position when power is not provided to the coil 36, a biasing member, such as a spring 42 may act on the plunger 38, or on a component engaged with the plunger, as set forth below. In at least some implementations, the clutch assembly 30 is engaged when the plunger 38 is in the second position and the clutch assembly 30 is disengaged when the plunger 38 is in the first position. While in the example shown the plunger 38 is in its second position when power is provided to the coil 36 and the plunger 38 moves to the first position when power is not supplied to the coil 36, the opposite could be true if desired (e.g. the clutch assembly 30 could be moved to the engaged position by the biasing member 42 and disengaged by powering the coil 36).

In at least some implementations, the clutch assembly 30 is an engaging clutch such as a dog clutch, and includes a first clutch member 44 that is not movable in an axial direction (defined by the central axis 24 of the plunger), and a second clutch member 46 that is movable in the axial direction relative to the first member 44.

In at least some implementations, the clutch assembly 30 may be used, for example, in a so-called free running differential 10, that selectively interrupts and permits torque transmission therethrough. In this device, a first rotating body is the outer differential housing 12 and a second rotating body is an inner housing 48, and the first rotating body and the second rotating body rotate about a common rotational axis 24. The inner housing 48 includes clutch teeth or, as in the implementation shown, the inner housing 48 is connected to the first clutch member 44 that includes the clutch teeth 50. In the example shown, the first clutch member 44 is coupled to the pinion gear shaft 26 and is constrained against axial movement relative to the second clutch member 46.

Referring to FIG. 2, the second clutch member 46 may be coaxial with the axis 24 of the plunger 38, and may be received outboard of the pinion gear 14 (i.e. farther from the axis 24 than the pinion gear 14). The second clutch member 46 may include a rear face 52 closer to the plunger 38 than a front face 54, with the front face 54 having at least one engagement feature, such as gear or clutch teeth 56 (e.g. dog clutch teeth) configured to engage a corresponding engagement feature (e.g. gear or dog clutch teeth 50) formed on the first clutch member 44.

In at least some implementations, the second clutch member 46 may be connected to a carrier 58. The carrier 58 may radially position the second clutch member 46 and/or provide a radially outer surface that is detected by a suitable sensor to enable detection of the position of the second clutch member 46 (and hence, determination of the state of the clutch 30), as desired. In the implementation shown, the carrier 58 is annular and includes a central opening 60 received over a tubular portion 62 of the outer housing 12 about which the plunger 38 is received. An axially extending support may be defined by an annular flange 64, or spaced apart fingers radially spaced from the opening 60, to connect the carrier 58 to the second clutch member 46 at a location radially spaced from the tubular portion 62 of the outer housing 12, in at least some implementations. The second clutch member 46 may be trapped between a first face 66 of the carrier 58 adjacent to the rear face 52 of the second clutch member 46 and a radially bent end 68 of the support surface 64 that engages a radially extending surface of the second clutch member 46, shown as being defined in a groove 70 formed in a radially inner surface of the second clutch member 46. In this way, the carrier 58 and second clutch member 46 move together in both directions of movement of the second clutch member 46. The spring 42 may be retained by and act on the first face 66 of the carrier 58 to bias second clutch member 46 to a retracted position in which the second clutch member teeth 56 are not meshed with the first clutch member teeth 50. The spring 42 may be received between a portion of the outer housing 12 and a portion of the carrier 58 and may be located radially inwardly or radially outwardly of the second clutch member 46, or both (e.g. more than one spring may be provided). Like the coil 36 and plunger 38, the second clutch member 46 also is carried by and rotates with the outer housing 12.

The plunger 38 may be formed from multiple materials including a material that is magnetically responsive to the magnetic field generated by the coil 36, and at least one other material that may or might not be responsive to the magnetic field. Thus, when the magnetic field is generated by the coil 36, the plunger 38 may be driven from one position to another (e.g. from the retracted to the advanced position). As used herein, a material is responsive to a magnetic field if a magnetic field of the magnitude generated by a solenoid 34 of the type used in applications such as that described herein, may cause a component formed of or including such material to be displaced.

In at least some implementations, as shown in FIGS. 1 and 2, the plunger 38 includes a main body with a central axis that may be coaxial with axis 24, and the plunger 38 may be defined by a first body 74 and a second body 76 that are coupled together and move as one unit or component and are not separated during use. The first body 74 may be formed from a magnetically responsive material and may be received adjacent to and radially inwardly of the coil 36, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping or extruding may be used.

In the implementation shown, the plunger 38 includes or is associated with a radially outwardly extending end piece 78 that has an axially extending rim 80 that engages a second face 79 the carrier 58 at a position radially overlapped by the second clutch member 46. That is, the rim 80 is radially aligned with the second clutch member 46. The end piece 78 may be formed in the same piece of material as the second body 76 or as a separate component that is fixed to the second body 76 in at least some implementations. Of course, other implementations may be utilized, as desired. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 38 when the coil 36 is energized. In this way, the magnetic field is more concentrated or stronger in the area of the first body 74 to increase the magnetic flux at or in the first body and improve the responsiveness of the plunger 38 to the generated magnetic field.

As shown in FIGS. 1 and 2, the second body 76 may have an inner surface 82 that is received adjacent to or around a surface 84 of the differential housing 12. The inner surface 82 may define a pilot diameter for receipt of the plunger 38 over the annular surface 84 of the differential housing 12 for guided linear, axial movement of the plunger 38 relative to the differential housing 12. In at least some implementations, the housing surface 84 may be defined by a sleeve 86 received over the tubular extension of the housing 12. The sleeve 86 may include an axially extending portion 88 with an outer surface that defines at least part of the surface 84, and a radially extending portion 90 adjacent to a rear face 92 of the plunger 38 (i.e. the face or side farthest from the second clutch member 46) and which may limit movement of the plunger 38 in that direction. The radially extending portion 90 may also be connected to a coil housing 96 in which the coil 36 is received, to radially position and retain the coil housing 96 relative to the outer housing 12. Other or additional retention features may be provided to mount the coil 36 on or relative to the outer housing 12.

In FIG. 1, the differential 10 is shown with the clutch 30 in a disengaged position. In the illustrated implementation, in the disengaged position of the clutch 30, the coil 36 is not powered, the plunger 38 is in its first position (i.e. retracted position) and the second clutch member 46 is not engaged with the first clutch member 44 (that is, second clutch member teeth 56 are not meshed with the first clutch member teeth 50). In the disconnected position, the shafts/axles 20, 22 are not actively driven and may rotate relative to the second clutch member 46 and outer housing 12.

To change the clutch 30 from the disengaged position to the engaged position, shown in FIG. 2, the coil 36 is powered to generate a magnetic field that drives the plunger 38 its second position (i.e. advanced position) which drives the second clutch member 46 into engagement with the first clutch member (i.e. teeth 58 engage and mesh with teeth 50). In this position, the inner housing 48 is coupled to and rotates with the outer housing 12 and torque is transmitted to the axles 20, 22.

In at least some implementations, there is a desire to maintain the engaged position of the clutch 30 without having to maintain power to the coil 36. In at least some implementations, this is accomplished with a magnetically responsive stop member 100. In the example shown in FIGS. 1 and 2, the stop member 100 is one or more plate(s) or post(s), and will be further described as a post having a permanent magnet 102 coupled to it, having north and south poles, and which is mounted within the magnetic field generated by the coil 36. In a retracted position, shown in FIG. 1, the stop member 100 does not interfere with movement of the plunger 38. In an advanced position of the stop member 100, shown in FIG. 2, a free end 104 or other portion of the stop member 100 is positioned radially overlapped with the plunger 38 and within the path of movement of the plunger 38. Therefore, when advanced, the stop member 100 engages and prevents movement of the plunger 38 back to its retracted position. In so doing, the plunger 38 is maintained in its advanced position in which the second clutch member 46 is advanced and in engagement with the first clutch member 44, and this position may be maintained after power to the coil is terminated.

When current of a first polarity is supplied to the coil 36, the plunger 38 is moved to its advanced position, and the stop member 100 is advanced. When the coil is no longer energized, the stop member 100 remains in its advanced position to retain the plunger 38 in its advanced position, and the clutch 30 in its engaged state.

To permit the plunger 38 to return to its retracted position, and the clutch 30 to its disengaged state, the stop member 100 is moved to its retracted position. To do this, current of a second, opposite polarity is supplied to the coil 36. This generates an opposite magnetic field that provides a force on the permanent magnet 102 of the stop member 100 in the opposite direction as the magnetic field generated by the first polarity current. This force moves the stop member 100 to its retracted position. With regard to the metallic/magnetically responsive plunger 38, the second, opposite polarity and associated magnetic field also tends to move the plunger to its advanced position. When the stop member 100 is retracted, the current to the coil 36 may be terminated which terminates the magnetic field acting on the plunger 38. When this occurs, the spring 42 acts on the plunger 38 and drives the plunger 38 and second clutch member 46 to their retracted positions, thereby disengaging the clutch 30.

To permit electricity of different polarity to be provided to the coil 36, a suitable circuit 106 may be provided between a source 108 of electricity and the coil 36. That circuit 106 may include an H-bridge 110 or other switching arrangement or other circuitry suitable to provide electric power to the coil 36 as described.

A magnetically responsive and electrically/magnetically driven stop member may be implemented in different ways. In the example of FIGS. 1 and 2, the stop member 100 is mounted to a front side 112 of the coil 36, axially between the coil 36 and the second clutch member 46. The stop member 100 in this implementation moves radially relative to the plunger 38 to selectively engage a radially extending stop surface 114 of the plunger 38, shown as being defined in a groove formed in the radially outer surface of the plunger 38, between the front face 116 and rear face 92 of the plunger.

Figure 4:
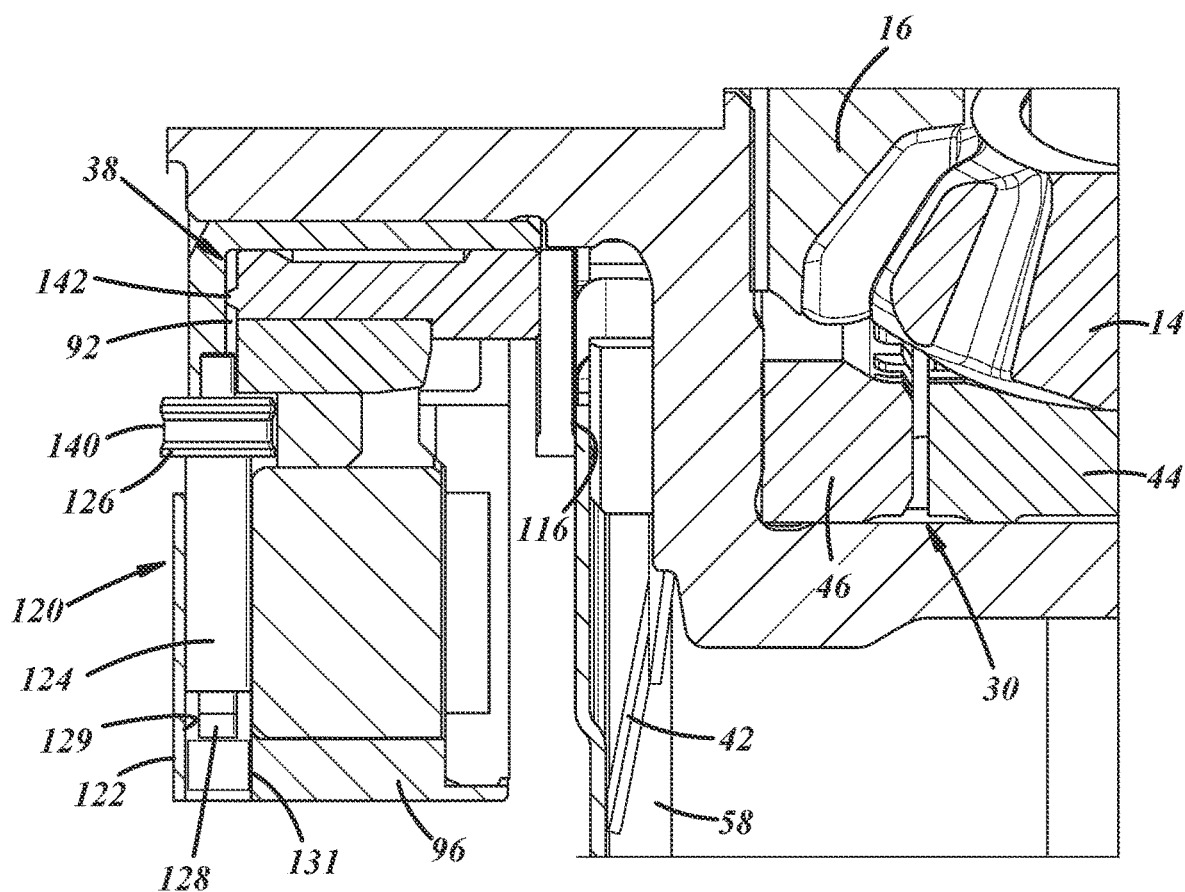
FIG. 4 is a cross-sectional view of a portion of a differential with an electrically actuated clutch and an electrically actuated stop member, wherein the clutch is shown in a disengaged position.
Figure 5:
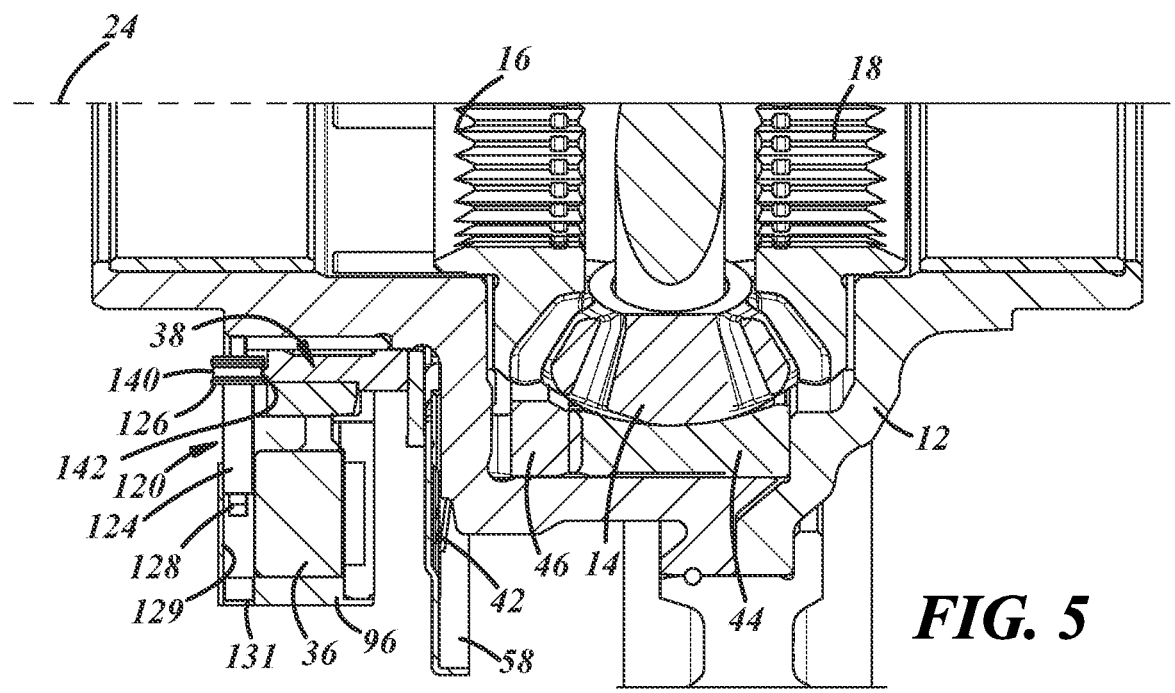
FIG. 5 is a cross-sectional view of a portion of the differential with the clutch shown in an engaged position and the stop member shown in an advanced position.

In the example shown in FIGS. 4 and 5, the same reference numbers used with respect to the embodiment of FIGS. 1 and 2 are used to designate the same or similar components, and the description of this additional embodiment will focus on the differences from that of FIGS. 1 and 2. In this implementation, a stop member 120 is mounted to a rear side 122 of the coil housing 96, with the coil 36 between the stop member 120 and the second clutch member 46. The stop member 120 in this implementation moves radially inwardly and relative to the plunger 38 to selectively engage a radially extending stop surface of the plunger 38, shown as being defined by the rear face 92 of the plunger 38. In this implementation, a magnet may be provided on a shaft 124 or head 126 of the stop member 120. The stop member shaft 124 may slide within a bore 129 or channel in the coil housing 96 or an adjacent structure, as desired, and include a magnet 128 (e.g. permanent magnet with north and south poles). A ferrous plug 131 or other ferrous structure (e.g. a magnetic component) may be provided at or near an end of the path of movement of the stop member 120, and the magnet 128 may be attracted to the ferrous plug 131 to hold the stop member 120 in the retracted position until the stop member 120 is acted upon by a suitable magnetic field from the armature. The plug 131 may conveniently be threaded and may be rotated into position to provide a desired stop for the retracted position of the stop member. In at least some implementations, the shaft 124 may extend beyond the head 126 (or the stop member 120 may include a projection extending from the head) and may provide an engagement surface that limits movement of the plunger 38 away from its retracted position (i.e. may define the retracted position of the plunger). This is shown in FIG. 4 in which the plunger is retracted, the clutch is in its disengaged state and the rear face 92 of the plunger 38 is in contact with the shaft 124 at a location radially inward of the head 126.

In FIG. 5, the clutch 30 is shown in an engaged state, with the plunger 38 advanced and with the stop member 120 advanced. In this position, the head 126 radially overlaps and is in contact with the rear face 92 of the plunger 38 to maintain the plunger in its advanced position. The plunger 38 and stop member 120 may be driven between their respective retracted and advanced positions in the same manner described with reference to the stop member 100.

Figure 6:
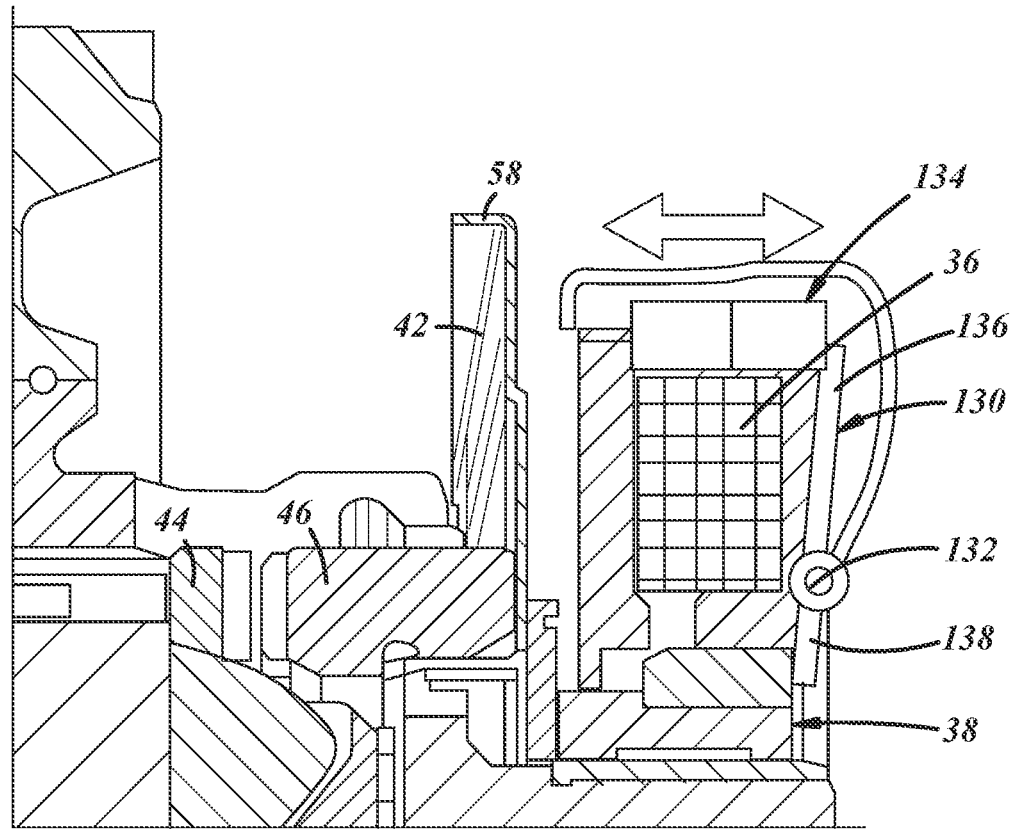
FIG. 6 is a fragmentary sectional view of a portion of an electrically actuated having a pivoted stop member shown in an advanced position.

In the example shown in FIG. 6, a stop member 130 is pivotably mounted to the coil 36, such as about a pin 132 connected to the coil housing 96 or an adjacent structure, for rotation or pivoted movement of the stop member 130 relative to the plunger 36 between advanced and retracted positions. The direction of rotation or pivoting can be controlled as a function of the polarity of the current provided to the coil 36, and movement or retention of the stop member 130 may be enabled by a permanent magnet 134 on the coil housing 96 with one pole arranged closer to an end 136 of the stop member 130 that is on the opposite side of the pin 132 as an end 138 that engages the plunger 38 in the advanced position.

In at least some implementations, the force of spring 42 acting on the plunger 38 holds the plunger 38 against the stop member 100, 120 and may retain or help retain the stop member 100, 120 in its advanced position. In addition, in at least some implementations, ferrous material or a magnet may be provided near the magnet on the stop member 100, 120 when the stop member is in the advanced position, to help retain the stop member in the advanced position (that is, the permanent magnet associated with the stop member may provide a force tending to hold the position of the stop member).

If desired, the stop member 120 shown in FIGS. 4 and 5 and plunger 38 may include a detent or other arrangement to retain or improve retention of the stop member 120 in the advanced position. In this implementation, this is shown as a radiused portion 140 of the head 126 of the stop member 120 (an axially variable surface) and an axial projection 142 off the rear face 92 of the plunger 38 that rests in the radiused portion 140 when the stop member 120 is advanced, as shown in FIG. 5. So arranged, radial movement of the stop member 120 would increase the engagement of the stop member 120 with the plunger 38, with the plunger being acted upon by the spring 42 and held against the stop member 120 under the force of the spring.

Other arrangements may be used to improve retention of the stop member in its advanced position. For example, in the implementation shown in FIGS. 1 and 2 (and labeled in FIG. 2), a ball detent mechanism 144 is provided on the coil housing 96. This includes a ball 146 that is biased by a spring 148 to overlap an end 150 (or other portion) of the stop member 100 when the stop member 100 is advanced, as shown in FIG. 2, and block radial retraction of the stop member absent a stronger force acting on the stop member to retract it. The force of the magnetic field used to retract the stop member 100 is sufficient to overcome the spring bias force on the ball 146, to permit retraction of the stop member 100.

Figure 3:
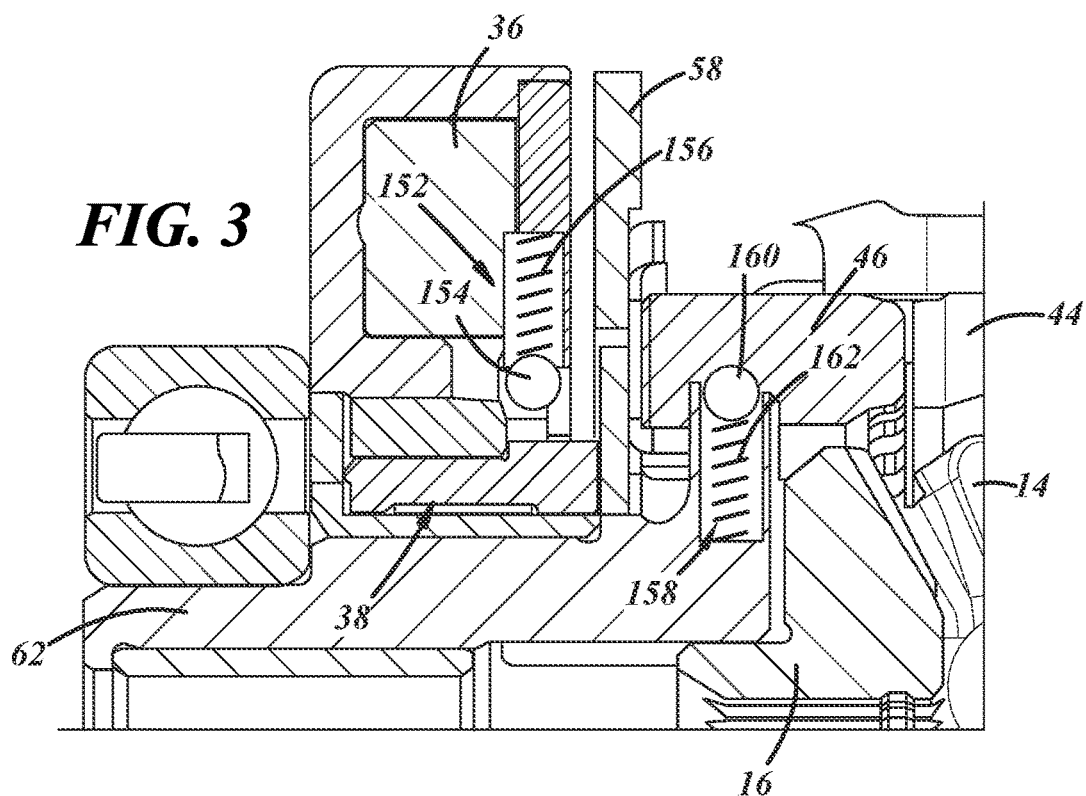
FIG. 3 is a cross-sectional view of a portion of an electrically actuated clutch including detent retention members.

Next, as shown in FIG. 3, ball detent or other retention mechanisms may be implemented to temporarily hold a position of one or both of the plunger 38 and the second clutch member 46. In FIG. 3, a first detent mechanism 152 includes a ball 154 biased by a spring 156 toward the plunger 38, to yieldably hold the plunger 38 in a desired position (e.g. the advanced position in at least some implementations). A second detent mechanism 158 includes a ball 160 biased by a spring 162 toward the second clutch member 46 to yieldably hold the second clutch member 46 in a desired position (e.g. the advanced position in at least some implementations). In this context, yieldably means that the components are retained in a position absent a force stronger than the detent mechanism acting on the component to move the component relative to the detent mechanism.

With the electrically driven actuator, the clutch 30 can be selectively engaged and disengaged to provide a desired torque transmission arrangement. The electrically driven stop member 100, 120, 130 permits the engaged state of the clutch 30 to be maintained without the need to maintain current supply to the coil 36. In this way, the plunger 38 can be maintained in both its retracted and advanced states without requiring electricity to the coil 36, and electricity can be supplied to the coil 36 to change the state of the clutch 30, as set forth above. Alternatively, in an arrangement in which the plunger 38 is spring biased to its advanced position and is moved to its retracted position by the solenoid 34, then the stop members may be arranged to maintain the retracted position of the plunger 38 and the disengaged state of the clutch 30, without current supply to the coil 36.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention. For example, while described with reference to a differential disconnect, such as may be used in an e-axle application, the electrically actuated clutch and electromagnetically actuated stop member may be used in a wide range of applications. For example, without limitation, the clutch and stop member may be used to maintain desired positions of the clutch in secondary drive applications such as in internal combustion engine drive trains, hybrid electric drivetrains. This system could be used with a front or rear axle on an internal combustion engine or hybrid electric vehicle that has a primary drive axle and where the secondary drive axle is not always needed and may be disconnected. The disconnect system may be within a differential as described or a different disconnect assembly as is known in the art. This system could also be on larger applications like 2 drive axle on and off road applications, or in a locking differential. And this system can be used for any final drive unit such as an axle assembly including a hypoid front or rear, as was as in a transfer case or power transfer unit and transmission system.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A rotary power transmission device, comprising:
a first housing having an interior in which multiple gears are received for rotation;
a second housing carried by the first housing;
a clutch received within the first housing and having a first clutch member coupled to the second housing and a second clutch member coupled to the first housing, the second clutch member being movable and selectively engageable with the first clutch member;
an actuator having a coil and a plunger driven for movement by a magnetic field generated by the coil, wherein the plunger moves along an axis and moves the second clutch member relative to the first clutch member; and
a stop member movable between a retracted position spaced from the plunger and an advanced position within a path of movement of the plunger to limit movement of the plunger when the stop member is in the advanced position.

2. The device of claim 1 wherein the stop member moves in response to the magnetic field generated by the coil.

3. The device of claim 2 wherein the stop member moves toward the advanced position when current of a first polarity is supplied to the coil, and the stop member moves away from the advanced position when current of a second polarity is supplied to the coil.

4. The device of claim 1 wherein the plunger has a first position in which the plunger does not cause the second clutch member to engage the first clutch member and the plunger has a second position in which the plunger causes the second clutch member to engage the first clutch member, and when the stop member is in the advanced position the stop member prevents movement of the plunger away from the second position.

5. The device of claim 4 wherein the stop member is maintained in the advanced position without a magnetic field being generated by the coil.

6. The device of claim 5 which also includes a retention mechanism having a first position in which the retention mechanism prevents movement of the stop member and a second position in which movement of the stop member is permitted.

7. The device of claim 6 wherein the retention mechanism includes a ball that is yieldably biased by a spring into the path of movement of the stop member.

8. The device of claim 3 wherein the stop member includes a permanent magnet within the magnetic field generated by the coil, and wherein the stop member moves to the advanced position when current of a first polarity is provided to the coil and the stop member moves to the retracted position when current of a second polarity is provided to the coil.

9. The device of claim 8 which also includes a magnetic component to which the magnet is attracted or repelled to position the stop member in either the advanced position or the retracted position in the absence of a magnetic field being generated by the coil, and when a magnetic field is generated by the coil, the stop member is moved against the force between the magnetic component and the magnet.

10. The device of claim 1 wherein the stop member moves radially relative to the axis.

11. The device of claim 1 wherein the stop member is coupled to a pivot and the stop member rotates about the pivot between the advanced position and the retracted position.

12. The device of claim 11 which also includes a magnet spaced from the pivot and having a first pole closer to the stop member than a second pole, and wherein the stop member rotates about pivot when the coil generates a magnetic field.

13. The device of claim 1 wherein the stop member includes a ball yieldably biased by a spring to the advanced position to yieldably inhibit movement of the plunger, and wherein the plunger is moved relative to the stop member when the coil generates a magnetic field.

14. The device of claim 13 which includes a retention mechanism associated with the second clutch member to yieldably retain a position of the second clutch member.

15. The device of claim 10 wherein the plunger includes a radially extending stop surface that is selectively radially overlapped by the stop member.

16. The device of claim 15 wherein the stop member includes a radiused portion and the plunger includes a projection that is received against the radiused portion when the stop member is in the advanced position to yieldably retain the stop member in the advanced position.

17. A rotary power transmission device, comprising:
   a first housing having an interior in which multiple gears are received for rotation;
   a second housing carried by the first housing;
   a clutch received within the first housing and having a first clutch member coupled to the second housing and a second clutch member coupled to the first housing, the second clutch member being movable and selectively engageable with the first clutch member;
   an actuator having a coil and a plunger driven for movement by a magnetic field generated by the coil, wherein the plunger moves along an axis and moves the second clutch member relative to the first clutch member; and
   a stop member movable between a retracted position spaced from the plunger and an advanced position within a path of movement of the plunger to limit movement of the plunger when the stop member is in the advanced position, and wherein the stop member moves in response to the magnetic field generated by the coil.

18. The device of claim 17 wherein the stop member includes a permanent magnet within the magnetic field generated by the coil, and wherein the stop member moves to the advanced position when current of a first polarity is provided to the coil and the stop member moves to the retracted position when current of a second polarity is provided to the coil.

19. The device of claim 18 which also includes a magnetic component to which the magnet is attracted or repelled to position the stop member in either the advanced position or the retracted position in the absence of a magnetic field being generated by the coil, and when a magnetic field is generated by the coil, the stop member is moved against the force between the magnetic component and the magnet.

20. The device of claim 17 wherein the stop member moves radially relative to the axis.

* * * * *